United States Patent
Shigematsu et al.

(10) Patent No.: US 11,305,249 B2
(45) Date of Patent: Apr. 19, 2022

(54) HYDROGEN MIXED GAS GENERATION APPARATUS

(71) Applicant: FRIEND CO., LTD., Fukuoka (JP)

(72) Inventors: Isami Shigematsu, Fukuoka (JP); Naoki Hidaka, Fukuoka (JP)

(73) Assignee: FRIEND CO., LTD., Fukuoka (JP)

( * ) Notice: Subject to any disclaimer, the term of this patent is extended or adjusted under 35 U.S.C. 154(b) by 0 days.

(21) Appl. No.: 17/046,333

(22) PCT Filed: Apr. 19, 2018

(86) PCT No.: PCT/JP2018/016146
§ 371 (c)(1),
(2) Date: Oct. 9, 2020

(87) PCT Pub. No.: WO2019/202704
PCT Pub. Date: Oct. 24, 2019

(65) Prior Publication Data
US 2021/0162360 A1  Jun. 3, 2021

(51) Int. Cl.
*B01J 6/00* (2006.01)
*C01B 3/04* (2006.01)

(52) U.S. Cl.
CPC ............... *B01J 6/008* (2013.01); *C01B 3/045* (2013.01)

(58) Field of Classification Search
CPC .. B01J 6/008; C01B 3/045; C01B 2203/1647; C01B 2203/1685; Y02E 60/36

USPC ....................................................... 422/162
See application file for complete search history.

(56) References Cited

U.S. PATENT DOCUMENTS

2013/0312384 A1   11/2013   Hwang

FOREIGN PATENT DOCUMENTS

| JP | 2009005881 A | 1/2009 |
|----|--------------|--------|
| JP | 2013151400 A | 8/2013 |
| JP | 2016529187 A | 9/2016 |
| JP | 2017105692 A | 6/2017 |
| JP | 2018025405 A | 2/2018 |
| WO | 20150155848 A1 | 10/2015 |

*Primary Examiner* — Huy Tram Nguyen
(74) *Attorney, Agent, or Firm* — Arent Fox LLP; Michael Fainberg (57) ABSTRACT

A hydrogen mixed gas generation apparatus includes a superheated vapor heating part that heats a raw water to generate a superheated vapor and further heats the superheated vapor to produce a mixed gas that includes a hydrogen gas, and a communication part that is communicable with a predetermined terminal device and transmits information to the terminal device. The superheated vapor heating part houses a reduction acceleration member and includes a heating pipe where the raw water flows therein, and a coil heater that is wound around the heating pipe. The reduction acceleration member includes a first metal member that is formed of a stainless steel and includes a cylindrical part where rod bodies respectively extend from both ends thereof and a second metal member that is formed of an iron and steel material and is housed in the cylindrical part in a state where a plurality thereof are bundled.

5 Claims, 7 Drawing Sheets

HYDROGEN MIXED GAS GENERATION APPARATUS

CROSS-REFERENCE TO RELATED APPLICATION

This application is a national stage application of International Application No. PCT/JP2018/016146 filed on Apr. 19, 2018, which designates the United States, the entire contents of which are herein incorporated by reference.

FIELD

A disclosed embodiment relates to a hydrogen mixed gas generation apparatus.

BACKGROUND

It is conventionally known that it is effective to incorporate hydrogen into a human body in order to remove an active oxygen species that is considered as a cause that causes a lesion or dysfunction. Hence, a hydrogen mixed gas generation device is proposed that is capable of generating a hydrogen gas from a saturated vapor and incorporating a mixed gas that includes such a hydrogen gas into a human body (see, for example, Patent Literature 1).

CITATION LIST

Patent Literature

Patent Literature 1: Japanese Patent Application Publication No. 2013-151400

SUMMARY

However, an apparatus in Patent Literature 1 as described above or the like includes a heater that heats a vapor to approximately 600 to 750 degrees in order to obtain a hydrogen mixed gas from a saturated vapor and is provided with various types of components that include an electrical component or the like around the heater that is provided at a high temperature. Hence, as an abnormality occurs in various types of components, it is difficult to generate a mixed gas that includes a desired concentration of a hydrogen gas constantly.

An aspect of an embodiment is provided by taking the above into consideration and aims to provide a hydrogen mixed gas generation apparatus that is capable of generating a mixed gas that includes a desired concentration of a hydrogen gas as constantly as possible and is able to be capable of readily dealing with some kind of abnormality even if it occurs.

Solution to Problem

A hydrogen mixed gas generation apparatus according to an aspect of an embodiment includes a superheated vapor heating part that heats a raw water to generate a superheated vapor and further heats such a superheated vapor to produce a mixed gas that includes a hydrogen gas, and a communication part that is communicable with a predetermined terminal device and transmits, based on a preliminarily set condition, information that corresponds to such a condition, to the terminal device. The superheated vapor heating part houses a reduction acceleration member and includes a heating pipe where the raw water flows therein, and a coil heater that is wound around such a heating pipe. The reduction acceleration member includes a first metal member that is formed of a stainless one and has a cylindrical part where rod bodies respectively extend from both ends thereof, and a second metal member that is formed of an iron and steel material and is housed in the cylindrical part in a state where a plurality thereof are bundled.

Advantageous Effects of Invention

According to an aspect of an embodiment, it is possible to generate a mixed gas that includes a desired concentration of a hydrogen gas as constantly as possible and it is possible to readily deal with some kind of abnormality even if it occurs.

DETAILED DESCRIPTION OF EMBODIMENTS

Hereinafter, embodiments of a hydrogen mixed gas generation apparatus as disclosed in the present application will be explained in detail, with reference to the accompanying drawings. Additionally, this invention is not limited by embodiments as illustrated below.

Figure 1:
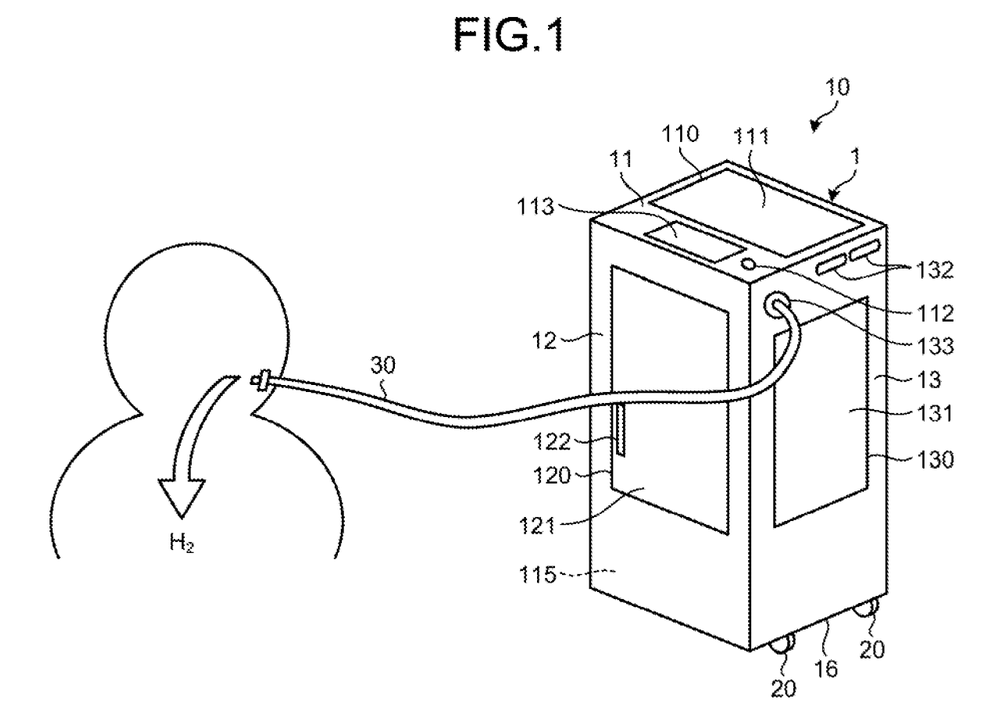
FIG. 1 is an explanatory diagram that illustrates a state of use of a hydrogen mixed gas generation apparatus according to an embodiment.

First, an outline of a hydrogen mixed gas generation apparatus 10 according to the present embodiment will be explained by using FIG. 1. FIG. 1 is an explanatory diagram that illustrates a state of use of a hydrogen mixed gas generation apparatus 10 according to an embodiment.

The hydrogen mixed gas generation apparatus 10 according to the present embodiment produces a mixed gas that includes a hydrogen gas ($H_2$) that is capable of being incorporated into a human body. As illustrated in FIG. 1, a user wears a tip of a gas inhalation tube 30 that extends from a casing 1, preferably at a nose thereof, so that it is possible to aspirate a produced hydrogen gas. A reason why it is preferable to inhale a mixed gas that includes a hydrogen gas from a nose is that it is possible to expect a higher effect on health promotion or the like. That is, that is because it is found that incorporating a component of a mixed gas directly from a mucous membrane in a nasal cavity into a human body improves an immune strength or improves an effect of reducing an onset of arteriosclerosis or acute myocardial infarction.

For the gas inhalation tube 30, it is possible to use, for example, a cannula or the like preferably. Although a single user is provided herein, it is also possible for two or more persons to execute use by providing a plurality of connection parts 133 of the gas inhalation tube 30 or branching the gas inhalation tube 30 into several pieces thereof.

The casing 1 of the hydrogen mixed gas generation apparatus 10 is formed into a rectangular box shape by a bottom wall 16, a ceiling wall 11, and four peripheral walls 12, 13, 14, 15 (see FIG. 4) and casters 20 with a spherical shape are attached to four corners of the bottom wall 16. Then, a transformer housing chamber 115 (see FIG. 3 and FIG. 5) that houses a transformer (an electrical transformer) 301 as described later is provided on a lower part of the casing 1. Such a casing 1 is formed of a stainless or steel plate that is provided with an appropriate thickness.

Furthermore, as illustrated in FIG. 1, a top access port 110 is formed on the ceiling wall 11 of the casing 1 and such a top access port 110 is covered by a lid body 111 that is provided to be attachable thereto and detachable therefrom. Then, a power source switch 112 and a touch panel 113 that functions as an operation part are provided on a front side of such a lid body 111. A communication part 201 as described later is provided on a bottom of the touch panel 113.

Such a communication part 201 is connectable to a predetermined communication device, for example, through a wireless LAN in conformity with a predetermined wireless communication standard. For example, it is connected to a communication network 200 (see FIG. 2) through a wireless LAN router and is communicable with a terminal device 250 (see FIG. 2) such as a support center that is also connected to the communication network 200 (see FIG. 2). Additionally, a support center is established by a distributor, a manufacturer, or the like for the hydrogen mixed gas generation apparatus 10 and is provided as a contact of after-sale service for a user. It is possible for the hydrogen mixed gas generation apparatus 10 according to the present embodiment to notify a support center of, based on a preliminarily set condition such as a case where an abnormality is detected in various types of devices or the like, information that corresponds to such a condition.

Furthermore, on a front wall 12 that is one of peripheral walls of the casing 1, a front access port 120 that occupies a majority of a surface area thereof is formed. A front door 121 that has a handle 122 is attached to such a front access port 120 through a non-illustrated hinge so as to be openable and closable.

Moreover, also on a left wall 13 that is one of peripheral walls of the casing 1, a side access port 130 that occupies a majority of a surface area thereof is formed and such a side access port 130 is covered by a lid body 131 so as to be attachable thereto and detachable therefrom. Additionally, in the hydrogen mixed gas generation apparatus 10 according to the present embodiment, it is possible to execute maintenance of a control unit 101 (see FIG. 2 to FIG. 4) as described later from the side access port 130. A plurality of exhaust ports 132, 132 are formed above the side access port 130 and at positions near an upper edge part. A connection part 133 for the gas inhalation tube 30 is provided at a front position of such exhaust ports 132, 132 that is provided on a side of the front wall 12. Additionally, a plurality of exhaust ports 132, 132 are also formed at positions near upper edge parts of a right wall 14 and a back wall 15.

Figure 2:
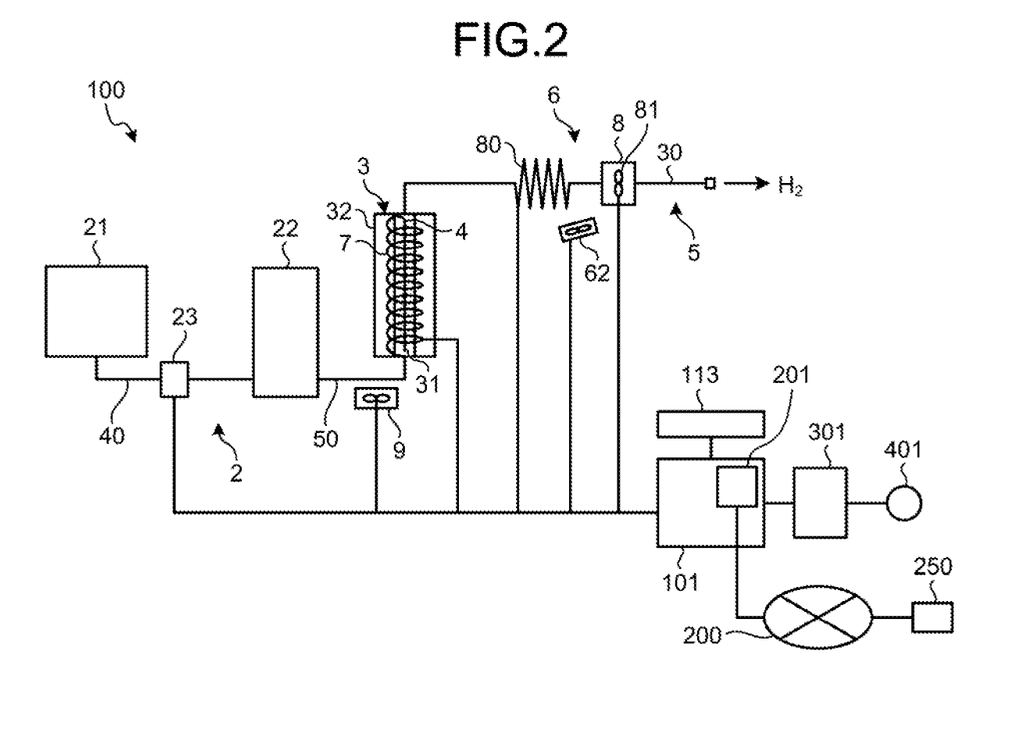
FIG. 2 is a schematic and explanatory diagram of a hydrogen mixed gas generation apparatus according to an embodiment.
Figure 3:
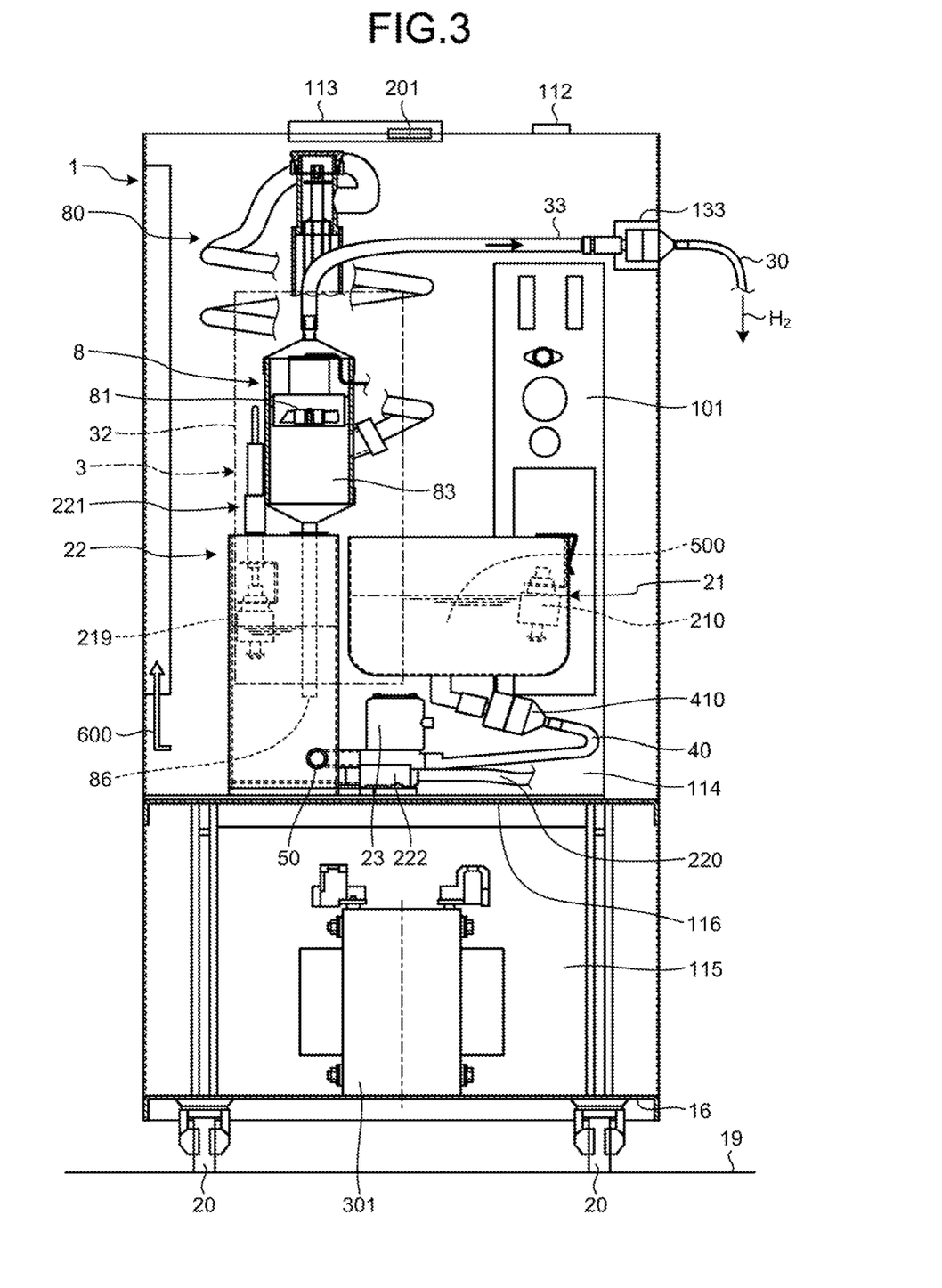
FIG. 3 is an explanatory diagram that illustrates an example of a configuration of a hydrogen mixed gas generation apparatus according to an embodiment in a front view thereof.
Figure 4:
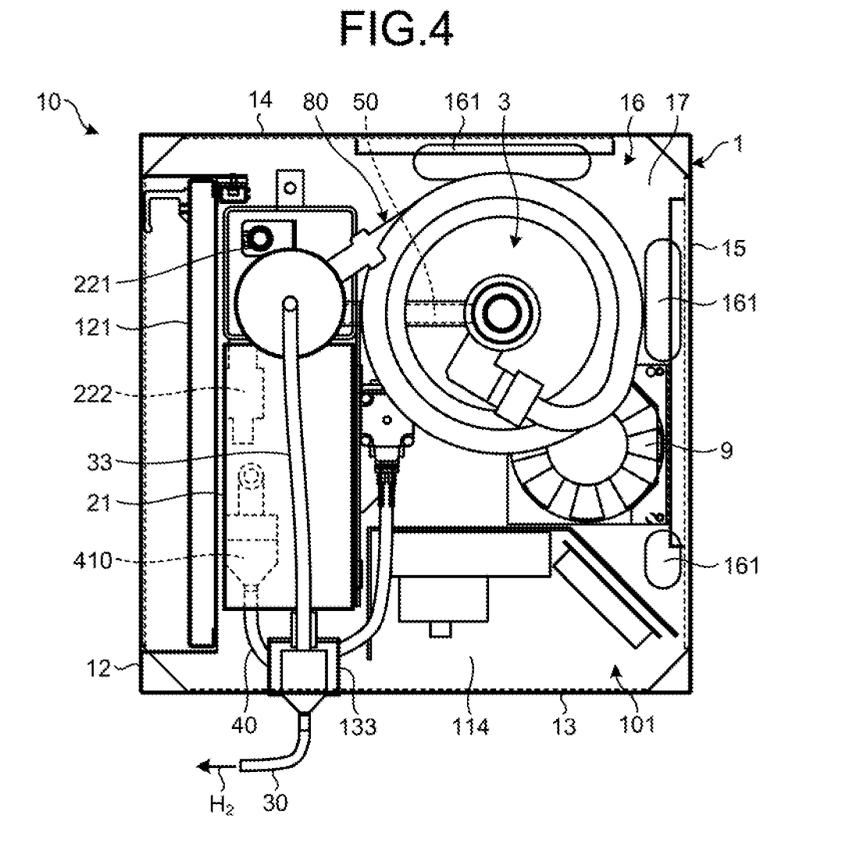
FIG. 4 is an explanatory diagram that illustrates an example of a configuration of a hydrogen mixed gas generation apparatus according to an embodiment in a plan view thereof.
Figure 5:
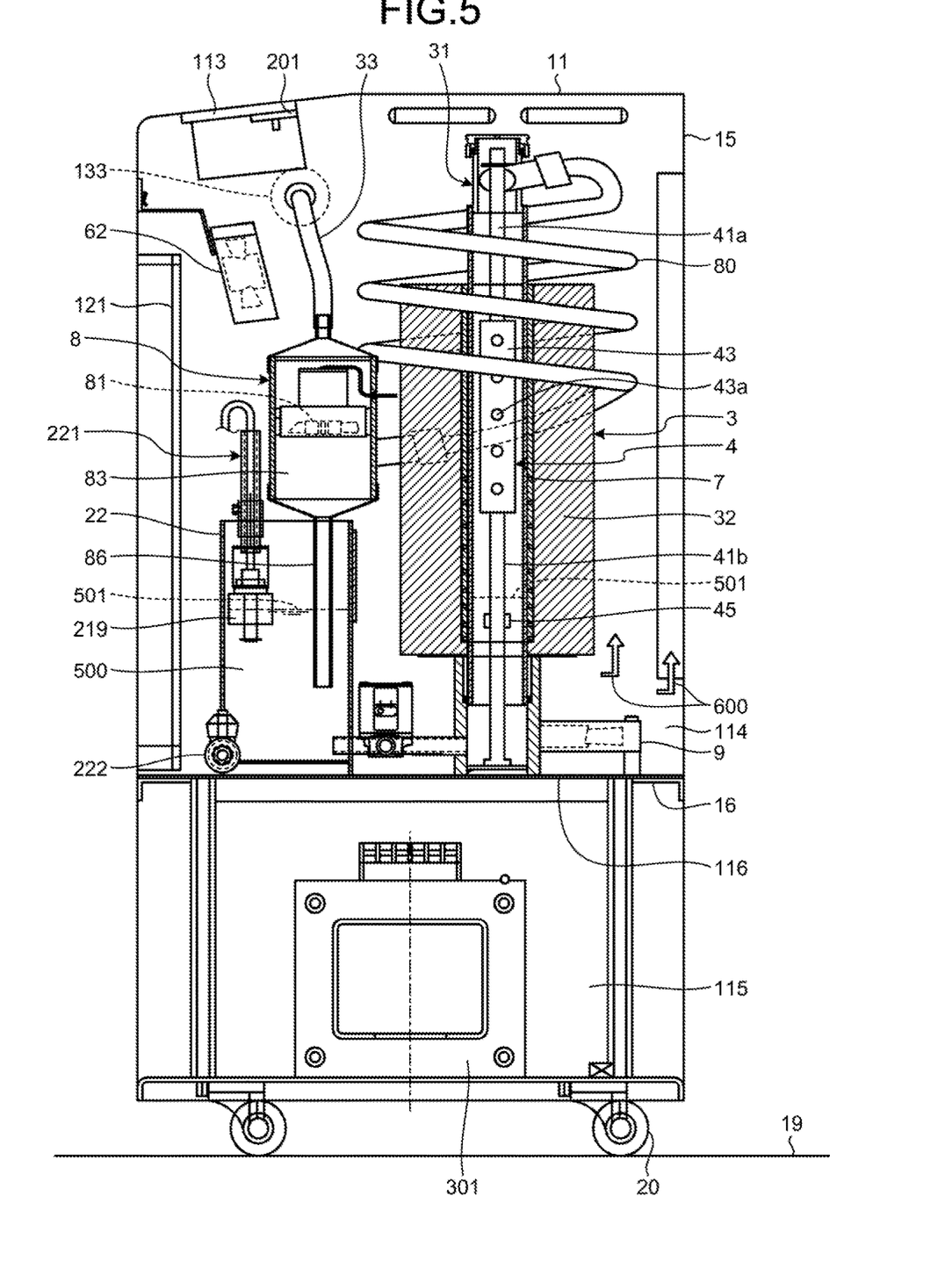
FIG. 5 is an explanatory diagram that illustrates an example of a configuration of a hydrogen mixed gas generation apparatus according to an embodiment in a side view thereof.

Hereinafter, a configuration that includes a layout of a hydrogen mixed gas generation apparatus 10 will be explained more specifically. FIG. 2 is a schematic and explanatory diagram of a hydrogen mixed gas generation apparatus 10 according to an embodiment. Furthermore, FIG. 3 is an explanatory diagram that illustrates an example of a configuration of the hydrogen mixed gas generation apparatus 10 that is identical to the above in a front view thereof, FIG. 4 is an explanatory diagram that illustrates an example of a configuration of the hydrogen mixed gas generation apparatus 10 that is identical to the above in a plan view thereof, and FIG. 5 is an explanatory diagram that illustrates an example of a configuration of the hydrogen mixed gas generation apparatus 10 that is identical to the above in a side view thereof. Additionally, in FIG. 3 and FIG. 5, sign 19 indicates a floor surface that is a placement surface for the hydrogen mixed gas generation apparatus 10. Furthermore, also in FIG. 3 to FIG. 5, appropriate simplification is applied to facilitate understanding.

As illustrated in FIG. 2, a hydrogen mixed gas generation apparatus 10 includes a hydrogen gas generation unit 100 that is provided as a functional part and such a hydrogen gas generation unit 100 includes a water supply part 2, a superheated vapor heating part 3 that has a reduction acceleration member 4 that accelerates reducing of a water vapor, a gas extraction part 5, a cooling part 6, and a control unit 101.

Furthermore, the hydrogen mixed gas generation apparatus 10 includes a transformer 301 that is connected to a plug 401 that is inserted into an outlet in order to be connected to a power source. Such a transformer 301 is included, so that it is also possible to utilize the hydrogen mixed gas generation apparatus 10 according to the present embodiment even in a country or a region where a voltage to be supplied from a power source is different therefrom. Additionally, although a power for the control unit 101 is also supplied through the transformer 301, it is also possible for the control unit 101 to monitor an operation state of the transformer 301.

The hydrogen gas generation unit 100 is housed in a functional part housing chamber 114 of a casing 1. That is, as illustrated in FIG. 3 and FIG. 5, an interior of the casing 1 that is formed into a rectangular box shape is formed so as to be partitioned into the functional part housing chamber 114 that is a first housing chamber and a transformer housing chamber 115 that is a second housing chamber that is provided on a bottom of such a functional part housing chamber 114. Then, the hydrogen gas generation unit 100 is housed in the functional part housing chamber 114 and the transformer 301 is housed in the transformer housing chamber 115. Additionally, a partition wall 116 that provides a partition into the functional part housing chamber 114 and the transformer housing chamber 115 also serves as a bottom wall part 17 (see FIG. 4) of the functional part housing chamber 114. Thus, the transformer 301 that is a relatively heavy object is arranged on a bottom of the casing 1, so that, when the hydrogen mixed gas generation apparatus 10 is placed on the floor surface 19, a stability thereof is provided even if an upper back thereof is high and a possibility of tumble thereof or the like is reduced as much as possible.

Furthermore, the hydrogen gas generation unit 100 heats a raw water from the water supply part 2 by the superheated vapor heating part 3 to produce a vapor, further heats such a vapor to produce a superheated vapor, and produces a mixed gas that includes a hydrogen gas by additional heating and an action of the reduction acceleration member 4. Then, a mixed gas that is separated from a vapor is provided in such a manner that a temperature thereof is lowered by the cooling part 6 so as to be capable of being aspirated into a human body, and is extracted from the gas extraction part 5 in such a manner that a hydrogen gas is capable of being inhaled.

As described in more detail, and as illustrated in FIG. 2 to FIG. 5, the water supply part 2 includes a water supply tank 21 that stores a raw water 500 and an adjustment tank 22 that adjusts a liquid level of the raw water 500 that is supplied to the superheated vapor heating part 3. The water supply tank 21 and the adjustment tank 22 are communicated by a water supply pipe 40 through an electromagnetic valve 23. Additionally, in FIG. 3 and FIG. 4, sign 410 indicates a coupler of the water supply pipe 40. An opening or closing operation of the electromagnetic valve 23 is controlled by the control unit 101 depending on a value of a water supply level meter 221. Additionally, the control unit 101 is provided with a general configuration that has a CPU (Central Processing Unit), a storage unit such as a ROM (Read Only Memory) or a RAM (Random Access Memory), and the like.

Furthermore, as illustrated in FIG. 3 and FIG. 5, a level switch 210 that detects an amount of water of the raw water 500 is arranged and provided on the water supply tank 21 and the water supply level meter 221 that includes a float 219 is provided on the adjustment tank 22. A water drainage hose 220 is attached to the adjustment tank 22 through a water drainage valve 222 and the front door 121 is opened to take the water drainage hose 220 from the front access port 120 to an outside thereof, so that it is possible to drain water in the adjustment tank 22.

As illustrated in FIG. 2, the superheated vapor heating part 3 that functions as a heating device includes a heating pipe 31 where the raw water 500 from the adjustment tank 22 flows therein and a coil heater 7 that is wound around a periphery thereof over a substantially total length thereof. Additionally, a periphery of the coil heater 7 is covered by a heat insulation material 32 that has a predetermined thickness. By such a configuration, it is possible for the superheated vapor heating part 3 to heat the raw water 500 that is supplied from the water supply part 2 to the heating pipe 31 through a communication pipe 50 by the coil heater 7 to generate a superheated vapor, and further heat such a superheated vapor to 600° C. to 700° C. to produce a mixed gas that includes a hydrogen gas ($H_2$). Herein, the reduction acceleration member 4 is housed in the heating pipe 31 so as to obtain an amount of generation of a hydrogen gas sufficiently. Additionally, such a reduction acceleration member 4 will be described in detail later.

An amount of the raw water 500 that is supplied to the heating pipe 31 is maintained constant by the adjustment tank 22. That is, as illustrated in FIG. 5, a liquid level 501 in the adjustment tank 22 and a liquid level 501 in the heating pipe 31 are identical levels. Additionally, a part above the liquid level 501 in the heating pipe 31 is a space where a vapor is generated therein, and in such a space, a vapor that is exposed to the reduction acceleration member 4 that is heated is further heated so as to be a superheated vapor and such a vapor and the reduction acceleration member 4 are further heated at a high temperature to accelerate a reduction reaction of the vapor and thereby generate a vapor mixed gas that includes a hydrogen gas. Thus, a mixed gas and a superheated vapor are mixed and present in a high temperature state inside the heating pipe 31. A specific configuration of the reduction acceleration member 4 that is housed in the heating pipe 31 in order to accelerate a reduction reaction that strips oxygen from a vapor, so as to obtain an amount of generation of a hydrogen gas sufficiently, will be described in detail later.

As illustrated in FIG. 2 to FIG. 5, the gas extraction part 5 includes a heat radiation tube 80, a gas delivery case 8, and a gas inhalation tube 30. That is, the gas delivery case 8 is connected to another end of the heat radiation tube 80 with one end that is communicated with a top of the heating pipe 31 and the gas inhalation tube 30 is communicated with such a gas delivery case 8 through a leading tube 33.

As illustrated in FIG. 3 and FIG. 5, a gas supply fan 81 is housed in the gas delivery case 8. By an operation of such a gas supply fan 81, a vapor mixed gas that includes a hydrogen gas is smoothly delivered from the gas inhalation tube 30 (a cannula) to an outside of such a system.

That is, by the gas supply fan 81, a mixed gas that is sent to a primary side of the gas supply fan 81 in the gas delivery case 8 is delivered to the gas inhalation tube 30 through the leading tube 33 that is communicated with a secondary side of such a gas supply fan 81. Additionally, as illustrated in FIG. 2, the gas supply fan 81 is connected to the control unit 101 and an operation of the gas supply fan 81 is controlled by the control unit 101.

A water droplet discharge port is formed on a bottom part of the gas delivery case 8 so as to be communicated with a gas convection space 83 that is formed on a primary side of the gas supply fan 81, where a proximal end of a drain pipe 86 is connected to such a water droplet discharge port and a distal end thereof faces an inside of the adjustment tank 22. Thus, in the gas delivery case 8, while a mixed gas is gas-supplied smoothly, a vapor that is not completely vapor-liquid-separated is retained in the gas convection space 83 and simultaneously is condensed therein and a condensed water is returned to the adjustment tank 22.

Meanwhile, as illustrated in FIG. 2 to FIG. 5, the heat radiation tube 80 that composes a part of the gas extraction part 5 is configured to be a coil shape and thereby facilitate heat radiation, and composes a part of the cooling part 6. Therefore, it is also possible to consider that the cooling part 6 is included in the gas extraction part 5. The cooling part 6 in the present embodiment includes the heat radiation tube 80 and a cooling fan 62 (see FIG. 5) that is arranged and provided in such a manner that it is possible to blow wind toward the heat radiation tube 80.

As illustrated in FIG. 3 to FIG. 5, the heat radiation tube 80 that is formed into a coil shape is arranged and provided so as to surround a periphery of the heat insulation material 32 of the superheated vapor heating part 3. By such a configuration, it is possible to utilize an internal space of the casing 1 effectively and it is possible to prevent the casing 1 from being needlessly upsized.

As illustrated in FIG. 5, the cooling fan 62 is arranged and provided so as to be tilted by a predetermined angle, so that it is possible to blow wind in such a manner that the wind is blown in a direction that traverses the heat radiation tube 80 obliquely upward. Therefore, it is possible to apply wind to the heat radiation tube 80 efficiently and yet it is possible to discharge a warm air that strips heat from the heat radiation tube 80, from an exhaust port 132 that is formed on a side wall of the casing 1 to an outside of the casing 1.

Furthermore, as illustrated in FIG. 4, a plurality of outside air introduction ports 161 that also contribute to weight saving of the casing 1 are provided on a bottom wall 16 of the casing 1. Moreover, as illustrated in FIG. 4, in a hydrogen mixed gas generation apparatus 10 according to the present embodiment, a fan 9 (see FIG. 2) that forcibly generates an ascending air current 600 in the casing 1 is provided so as to face one of the outside air introduction ports 161 that are formed on the bottom wall part 17. Herein, the fan 9 is arranged in such a manner that a part thereof overlaps with the superheated vapor heating part 3 in a plan view thereof. That is, the fan 9 is provided so as to face an outside air introduction port 161 that is provided near the superheated vapor heating part 3 among the plurality of outside air introduction ports 161 and is located in such a manner that a part thereof overlaps with the superheated vapor heating part 3 in a plan view thereof. As such a configuration is provided, an outside air rises along a peripheral surface of the superheated vapor heating part 3 so as to improve an air cooling effect.

By a configuration as described above, the raw water 500 that is supplied from the water supply tank 21 to the heating pipe 31 of the superheated vapor heating part 3 is heated by the coil heater 7, and as 100° C. is reached, a vapor thereof is provided. Then, such a vapor is further heated by the coil heater 7 to provide a superheated vapor, and further, is exposed to the reduction acceleration member 4 where a reduction reaction is accelerated, so that, as a temperature thereof reaches 600° C. to 700° C., a mixed gas that includes a hydrogen gas is produced.

Thus, it is possible for the hydrogen mixed gas generation apparatus 10 according to the present embodiment to supply a mixed gas that includes a hydrogen gas, and further, an oxygen gas, to a human body through the gas inhalation tube 30 (a cannula) and through a mucous membrane (see FIG. 1). Herein, a mixed gas is sufficiently cooled by the cooling part 6 (for example, at approximately 20 to 25° C.), so that it is possible to execute aspiration readily and safely.

Figure 6A:
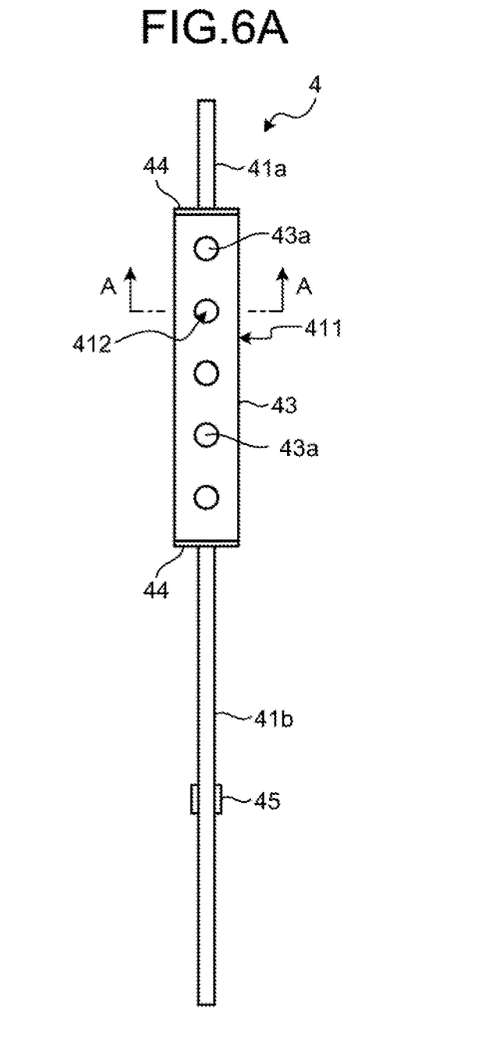
FIG. 6A is a front view that illustrates a reduction acceleration member according to an embodiment.
Figure 6B:
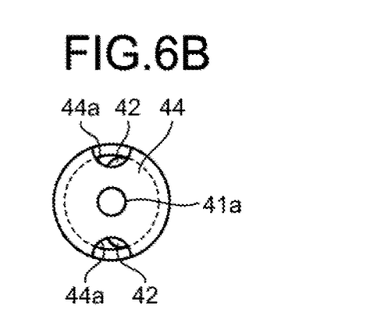
FIG. 6B is a plan view that illustrates a reduction acceleration member according to an embodiment.
Figure 7A:
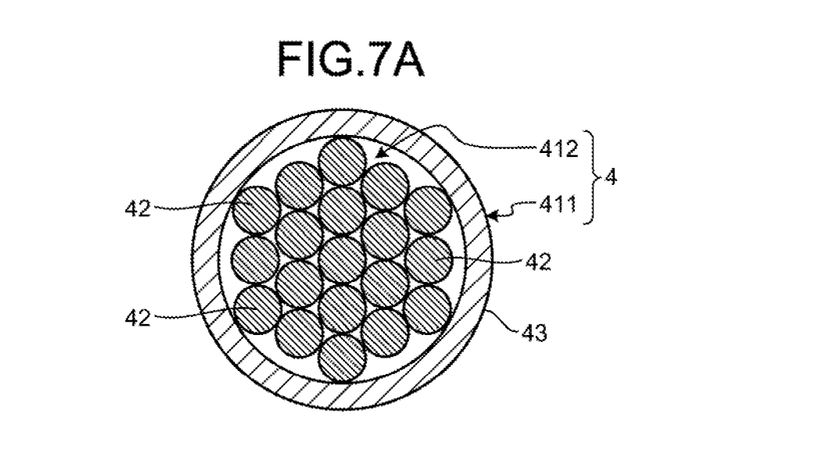
FIG. 7A is an enlarged cross-sectional view along line A-A in FIG. 6A.
Figure 7B:
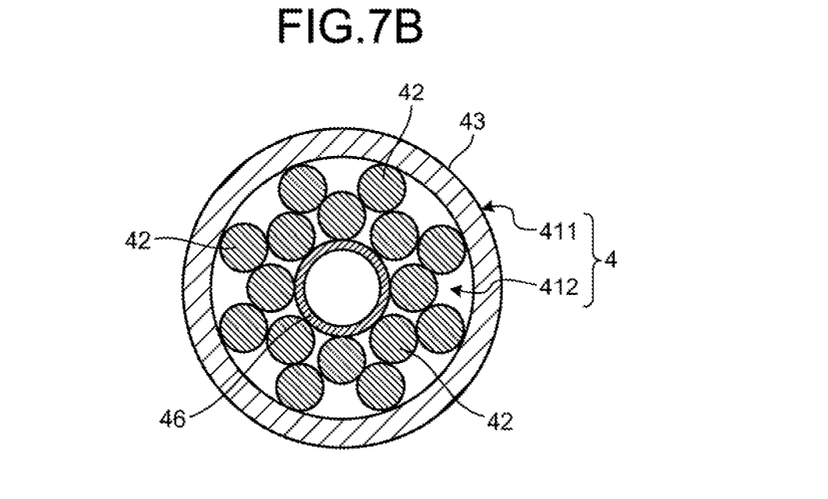
FIG. 7B is an explanatory diagram of a reduction acceleration member according to a variation example in a cross-sectional view thereof.

Herein, an explanation of a configuration of a superheated vapor heating part 3 and a reduction acceleration member 4 will be added with reference to FIG. 5 and FIG. 6A to FIG. 7B. FIG. 6A is a front view of a reduction acceleration member 4 according to an embodiment, FIG. 6B is a plan view that illustrates the reduction acceleration member 4 that is identical to the above, and FIG. 7A is an enlarged cross-sectional view thereof along line A-A in FIG. 6A. Furthermore, FIG. 7B is an explanatory diagram of a reduction acceleration member 4 according to a variation example in a cross-sectional view thereof.

As illustrated in FIG. 5, a reduction acceleration member 4 that is controllable so as to obtain an amount of generation of a hydrogen gas sufficiently and accelerates a reduction reaction of a vapor is housed in a heating pipe 31 that composes a superheated vapor heating part 3 of a hydrogen mixed gas generation apparatus 10.

The reduction acceleration member 4 that is housed in the heating pipe 31 where a raw water 500 is flown therein is composed of, for example, a metal that is readily oxidized, such as iron, in other words, a metal that is readily rusted. A configuration to arrange and provide such a reduction acceleration member 4 in the heating pipe 31 is provided by finding, in an experiment, that when a vapor that is generated in a high temperature state inside such a heating pipe 31 contacts a metal that is readily rusted, such as iron, an oxidation-reduction reaction is accelerated and an efficiency of generation of a hydrogen gas is improved significantly.

As illustrated in FIG. 6A, the reduction acceleration member 4 according to the present embodiment includes a holding member 411 that is a first metal member, for example, that is formed of a stainless steel and has a cylindrical part 43 where rod bodies respectively extend from both ends thereof, and an iron rod part 412 that is a second metal member, for example, where a plurality of iron and steel materials 42 with a rod shape are bundled. In the present embodiment, as illustrated in FIG. 7A, the iron rod part 412 is housed in the cylindrical part 43 of the holding member 411 in a dense state thereof. Such an iron rod part 412 substantially serves a function of reduction acceleration, where, in the present embodiment, a diameter of an iron and steel material 42 that is a so-called round steel with a circular shape in a cross-section thereof is 4 mm and S45C is used for a material thereof.

Thus, the iron and steel materials 42 that are round steels are densely bundled with no apace, so that it is possible to transfer heat to an inside of the cylindrical part 43 efficiently. Therefore, heat efficiently transfers to a whole of the iron rod part 412, so that it is possible to accelerate an oxidation-reduction reaction with a vapor.

Meanwhile, as illustrated in FIG. 6A, the cylindrical part 43 of the holding member 411 is provided with a structure in such a manner that openings of a cylindrical body on both ends thereof are blocked by cap materials 44. Then, a plurality of hole parts 43a are formed on a peripheral surface of a cylindrical body and a pair of communication holes 44a with a semicircular shape are oppositely formed on a cap material 44, in such a manner that it is possible for a vapor in the heating pipe 31 to contact the iron rod part 412 that is housed in an inside thereof sufficiently. A vapor penetrates from such hole parts 43a into an inside of the cylindrical part 43 so as to cause an oxidation-reduction reaction with the iron rod part 412.

Among two rod bodies that are possessed by the cylindrical part 43, a length of a first rod body 41a with an end that is connected to a cap material 44 that is provided on an upper end part of a cylindrical body in FIG. 6A is different from that of a second rod body 41b with an end that is connected to a cap material 44 that is provided on a lower end part of the cylindrical body. That is, as illustrated in FIG. 5, the second rod body 41b is formed so as to be relatively long, so that the iron rod part 412 in the cylindrical part 43 is never dipped in the raw water 500 and is located in a space that is filled with a vapor in a part above a liquid level 501 in the heating pipe 31.

Therefore, the raw water 500 that is supplied to the heating pipe 31 is heated by a coil heater 7 so as to be a vapor and a superheated vapor that is further heated by the coil heater 7 efficiently contacts the iron rod part 412 of the reduction acceleration member 4 so as to accelerate a reduction reaction, where, when a temperature thereof reaches 500° C. to 800° C., a mixed gas that includes a hydrogen gas is produced.

As illustrated in FIG. 5, at least the second rod body 41b of the holding member 411 is dipped in the raw water 500. Hence, all materials of the holding member 411 that includes the second rod body 41b are a stainless steel such as SUS 304. A stainless steel is used, so that, even though the holding member 411 is dipped in water, it is possible to prevent a red rust that clouds the raw water 500 redly and degrades an appearance from being generated.

As described above, the iron rod part 412 that is housed in the cylindrical part 43 of the holding member 411 is exposed to a superheated vapor in the heating pipe 31 at a high temperature, so that an active oxidation-reduction reaction is caused so as to strip oxygen from, and reduce, the superheated vapor and it reacts oxygen and is oxidized in itself. Thus, such an oxidation-reduction reaction is caused in the heating pipe 31, so that generation of a hydrogen gas is accelerated. Additionally, in association with such an action, a black rust is generated on a surface of the iron rod part 412 as time passes.

Additionally, as illustrated in FIG. 5 and FIG. 6A, in the reduction acceleration member 4 according to the present embodiment, a vaporization acceleration ring 45 is provided at a position that contacts the raw water 500 in a middle of the second rod body 41b. In a case where the vaporization acceleration ring 45 that is made of a metal and that is heated to be at a high temperature is located in the raw water 500, it is possible to increase a contact area between the raw water 500 and such a high-temperature part and attain acceleration of vaporization of the raw water 500.

It is also possible to provide a reduction acceleration member 4 with a configuration as illustrated in FIG. 7B. FIG. 7B is an explanatory diagram of a reduction acceleration member 4 according to a variation example in a cross-sectional view thereof. As illustrated in the figure, a reduction acceleration member 4 according to a variation example is configured in such a manner that a plurality of iron and steel materials 42 that are rod-shaped members are bundled and a pipe member 46 that is readily thermally-deformed is arranged at a central position thereof. That is, in an iron rod part 412 that is housed in a cylindrical part 43 of a holding member 411, the pipe member 46 with a material that is S45C similarly to the iron and steel materials 42 is arranged at a center thereof and the plurality of iron and steel materials 42 that are rod-shaped members are bundled around such a pipe member 46.

Herein, it is preferable for a diameter of the pipe member 46 to be greater than a diameter of an iron and steel material 42 that is 4 mm. Herein, a diameter of the pipe member 46 is 8 mm.

This is, for example, like a configuration as illustrated in FIG. 7A, where, as the iron and steel materials 42 are densely bundled with no space and are housed in the cylindrical part 43, deformation of each iron and steel material 42 is caused by a thermal expansion thereof. Hence, the pipe member 46 with a large diameter that is deformed more readily although an identical material is applied thereto is arranged at a central part of the iron rod part 412. By such a configuration, the pipe member 46 absorbs an expansion force that deforms the iron and steel materials 42, so that it is possible to prevent deformation of the iron rod part 412.

Additionally, a dimension of the iron rod part 412 such as a diameter or a length thereof is not limited to that in the present embodiment, and it is possible to execute appropriate determination thereof comprehensively by taking a desired amount of generation of a hydrogen mixed gas, an amount of heating, or the like into consideration.

The reduction acceleration member 4 as described above is provided so as to be insertable into and removable from an upper end of a heating pipe 31. Hence, it is possible for anyone to set the reduction acceleration member 4 simply by merely executing insertion thereof through an opening of the heating pipe 31 at an upper end thereof. After the reduction acceleration member 4 is housed in the heating pipe 31, it is preferable to close a lid for an opening of such a heating pipe 31 at an upper end thereof. On the other hand, in a case where the reduction acceleration member 4 or the like is extracted from the heating pipe 31 in order to execute replacement thereof, it is possible to open a lid and pinch and simply extract a first rod body 41a of a holding member 411.

Meanwhile, a hydrogen mixed gas generation apparatus 10 according to the present embodiment includes a communication part 201 as described above. As illustrated in FIG. 3 and FIG. 5, the communication part 201 is provided on a bottom of a touch panel 113 that is attached to a ceiling wall 11 of a casing 1.

Furthermore, as illustrated in FIG. 2, the communication part 201 is controlled by a control unit 101 and is communicable with a predetermined terminal device 250 through a communication network 200. Herein, the predetermined terminal device 250 is, for example, a personal computer that is included in a support center that is placed by a distributor, a manufacturer, or the like of the hydrogen mixed gas generation apparatus 10, a mobile terminal device such as a tablet or a smartphone, or the like. That is, a device is provided that is configured to have a CPU, a storage device such as a ROM, a RAM, or an HDD (Hard Disk Drive), and further, an input/output port or the like and include various types of circuits, and that includes at least a mail function.

For such a terminal device 250, the communication part 201 of the hydrogen mixed gas generation apparatus 10 transmits, based on a preliminarily set condition, information that corresponds to such a condition, to the terminal device 250 by a mail. A preliminarily set condition includes, for example, a case where an error occurs, a case where an operating time of the hydrogen mixed gas generation apparatus 10 is periodically notified of, or the like. An error is, for example, a case where a failure, an abnormal action, or the like of each device of a hydrogen gas generation unit 100, a transformer 301, or the like is detected. Furthermore, in a case where such a condition is created, the communication part 201 is controlled in such a manner that a communication process is automatically executed by the control unit 101, and it is also possible to operate the communication part 201 manually while a predetermined operation of a user is provided as a condition, so as to execute a communication process.

For example, a communication switch unit or the like is displayed on the touch panel 113, and in a case where a user needs a support for handling of the hydrogen mixed gas generation apparatus 10, and as such a communication switch unit is pushed by a finger thereof or the like, a mail for requesting contact is transmitted to a support center. A support center side that receives a mail contacts, by a return call, an owner of the hydrogen mixed gas generation apparatus 10 that transmits a mail for requesting contact, so that it is possible to deal with such a request of support promptly.

Figure 8:
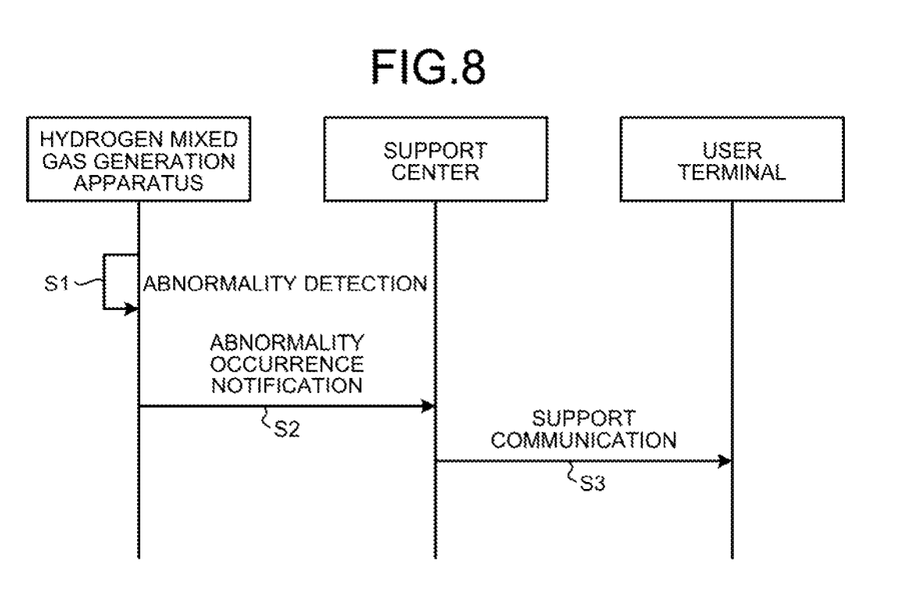
FIG. 8 is a sequence diagram that illustrates a communication process for a hydrogen mixed gas generation apparatus according to an embodiment.

FIG. 8 is a sequence diagram that illustrates a communication process of a hydrogen mixed gas generation apparatus 10. As illustrated in the figure, a control unit 101 of a hydrogen mixed gas generation apparatus 10 that is possessed by a user monitors an operation state of each device that is connected electrically (FIG. 2), and as an abnormality is detected in any one device (step S1: abnormality detection), a communication part 201 is activated to transmit, to a terminal device 250 of a support center (see FIG. 2), a signal that informs it of occurrence of the abnormality (step S2: abnormality occurrence notification). As a manager of a support center confirms that the terminal device 250 receives an abnormality occurrence notification, the manager contacts a user terminal that is possessed by a user (step S3: support communication).

Herein, a user terminal that is possessed by a user is provided as contact information that is preliminarily registered in a support center by a user, and is a fixed telephone, a mobile terminal device such as a smartphone or a mobile phone, or a personal computer. For support communication, it is preferable to execute telephonic communication preferentially for a fixed telephone, a mobile phone, or a smartphone. Furthermore, as a personal computer is included, it is also possible to execute mail communication secondarily.

As has been explained above, a hydrogen mixed gas generation apparatus 10 according to the present embodiment improves an efficiency of generation of a mixed gas, so that it is possible to generate a hydrogen gas more efficiently. Moreover, as an abnormality occurs during use, a support center is automatically notified thereof and it is possible to receive an appropriate support promptly from the support center that receives a notification. According to the embodiment as has been described above, a following hydrogen mixed gas generation apparatus 10 is realized.

(1) A hydrogen mixed gas generation apparatus 10, including a superheated vapor heating part 3 that heats a raw water 500 to generate a superheated vapor and further heats such a superheated vapor to produce a mixed gas that includes a hydrogen gas, and a communication part 201 that is communicable with a predetermined terminal device 250 and transmits, based on a preliminarily set condition, information that corresponds to such a condition, to the terminal device 250, wherein the superheated vapor heating part 3 houses a reduction acceleration member 4 and includes a heating pipe 31 where the raw water 500 flows therein, and a coil heater 7 that is wound around such a heating pipe 31, and the reduction acceleration member 4 includes a holding member 411 that is formed of a stainless one and has a cylindrical part 43 where rod bodies 41a, 41b respectively extend from both ends thereof, and an iron rod part 412 that is formed of an iron and steel material 42 and is housed in the cylindrical part 43 in a state where a plurality thereof are bundled.

By such a configuration, it is possible to generate a mixed gas that includes a desired concentration of a hydrogen gas as constantly as possible and it is possible to receive a support readily and promptly even if some kind of abnormality occurs.

(2) The hydrogen mixed gas generation apparatus 10 in (1) as described above, wherein the iron rod part 412 has a pipe member 46 and a plurality of iron and steel materials 42 that are bundled around such a pipe member 46.

By such a configuration, an expansion force that deforms the iron and steel materials 42 is absorbed by the pipe member 46, so that it is possible to prevent an overall deformation of the iron rod part 412.

(3) The hydrogen mixed gas generation apparatus 10 in (2) as described above, a diameter of the pipe member 46 is greater than those of the iron and steel materials 42.

By such a configuration, an expansion force that deforms the iron and steel materials 42 is absorbed by the pipe member 46 more readily, so that it is possible to improve an effect of (2) as described above.

(4) The hydrogen mixed gas generation apparatus 10 in any of (1) to (3) as described above, wherein lengths of the rod bodies 41a, 41b that extend from the cylindrical part 43 in the holding member 411 are defined to be lengths in such a manner that the cylindrical part 43 does not contact the raw water 500.

By such a configuration, the iron rod part 412 in the cylindrical part 43 is never dipped in the raw water 500 and a superheated vapor efficiently contacts the iron rod part 412 of the reduction acceleration member 4 to accelerate a reduction reaction thereof, so that it is possible to produce a mixed gas that includes a desired amount of a hydrogen gas effectively.

(5) The hydrogen mixed gas generation apparatus 10 in any of (1) to (4) as described above, including a casing 1 that is formed into a rectangular box shape, wherein the casing 1 is formed to be partitioned into a functional part housing chamber 114 and a transformer housing chamber 115 that is provided on a bottom of such a functional part housing chamber 114 through a partition wall 116, and a hydrogen gas generation unit 100 that includes at least the superheated vapor heating part 3 is housed in the functional part housing chamber 114 and a transformer 301 is housed in the transformer housing chamber 115.

By such a configuration, it is possible to execute utilization even in a country or a region where a voltage to be supplied from a power source is different therefrom, and further, the transformer 301 that is a relatively heavy object is arranged on a bottom of the casing 1, so that a stability thereof is improved and it is possible to reduce a possibility of tumble or the like as much as possible.

It is possible for a person skilled in the art to readily derive additional effects or variation examples. Hence, broader aspects of the present invention are not limited to specific details and representative embodiments as illustrated and described above. Therefore, various modifications are possible without departing from the spirit or scope of a general inventive concept that is defined by the appended claims and equivalents thereof.

REFERENCE SIGNS LIST 1 casing
3 superheated vapor heating part
4 reduction acceleration member
5 gas extraction part
7 coil heater
10 hydrogen mixed gas generation apparatus
31 heating pipe
41 rod body
41a first rod body
41b second rod body
42 iron and steel material
43 cylindrical part
46 pipe member
114 functional part housing chamber (first housing chamber)
115 transformer housing chamber (second housing chamber)
116 partition wall
411 holding member (first metal member)
412 iron rod part (second metal member)
201 communication part
250 terminal device
301 transformer
500 raw water

The invention claimed is:

1. A hydrogen mixed gas generation apparatus, comprising:
 a superheated vapor heating part that heats a raw water to generate a superheated vapor and further heats the superheated vapor to produce a mixed gas that includes a hydrogen gas; and
 a communication part that is communicable with a predetermined terminal device and transmits, based on a preliminarily set condition, information that corresponds to the condition, to the terminal device, wherein
 the superheated vapor heating part houses a reduction acceleration member and includes a heating pipe where the raw water flows therein, and a coil heater that is wound around the heating pipe, and
 the reduction acceleration member includes:
  a first metal member that is formed of a stainless steel and includes a cylindrical part where rod bodies respectively extend from both ends thereof; and a second metal member that is formed of an iron and steel material and is housed in the cylindrical part in a state where a plurality thereof are bundled.

2. The hydrogen mixed gas generation apparatus according to claim 1, wherein the second metal member includes a pipe member and a plurality of rod-shaped members that are bundled around the pipe member.

3. The hydrogen mixed gas generation apparatus according to claim 2, wherein a diameter of the pipe member is greater than diameters of the rod-shaped members.

4. The hydrogen mixed gas generation apparatus according to claim 1, wherein lengths of the rod bodies that extend from the cylindrical part in the first metal member are defined in such a manner that the cylindrical part does not contact the raw water.

5. The hydrogen mixed gas generation apparatus according to claim 1, further comprising
   a casing that is formed into a rectangular box shape, wherein
   the casing is formed to be partitioned into a first housing chamber and a second housing chamber that is provided on a bottom of the first housing chamber through a partition wall, and
   a functional part that includes at least the superheated vapor heating part is housed in the first housing chamber and a transformer is housed in the second housing chamber.

* * * * *